United States Patent
Wu et al.

(10) Patent No.: US 9,602,205 B2
(45) Date of Patent: Mar. 21, 2017

(54) MULTIDIRECTIONAL OPTICAL POSITIONING METHOD AND DEVICE THEREOF

(71) Applicant: EDISON OPTO CORPORATION, New Taipei (TW)

(72) Inventors: Chien Jung Wu, New Taipei (TW); Chien Yu Shen, New Taipei (TW)

(73) Assignee: Edison Opto Corporation, New Taipei (TW)

( * ) Notice: Subject to any disclaimer, the term of this patent is extended or adjusted under 35 U.S.C. 154(b) by 233 days.

(21) Appl. No.: 14/552,709

(22) Filed: Nov. 25, 2014

(65) Prior Publication Data
US 2016/0056893 A1 Feb. 25, 2016

(30) Foreign Application Priority Data

Aug. 20, 2014 (TW) .............................. 103128534 A (51) Int. Cl.
*H01J 40/14* (2006.01)
*H04B 10/116* (2013.01)
*G01B 11/00* (2006.01)

(52) U.S. Cl.
CPC .......... *H04B 10/116* (2013.01); *G01B 11/002* (2013.01)

(58) Field of Classification Search
CPC ............................ H04B 10/114; G01C 21/206
See application file for complete search history.

(56) References Cited

U.S. PATENT DOCUMENTS 3,885,876 A * 5/1975 Konopka .................. G01S 1/70
340/955

* cited by examiner

*Primary Examiner* — Thanh Luu
(74) *Attorney, Agent, or Firm* — Winston Hsu; Scott Margo (57) ABSTRACT

A multidirectional optical positioning method and a device thereof, and more particularly a signal transmission and positioning method applied to visible light communication and a device thereof. The device includes a transparent board having multiple different light conversion layers on the surface. The light conversion layers are arranged in one single axial direction. A light emitting unit is used to project an incident light onto an incident side of the transparent board. After the incident light passes through the light conversion layers, the incident light is converted into multiple radiating lights with different physical effects, which are emitted from an emission side of the transparent board. A sensor is disposed on the emission side of the transparent board to receive the radiating lights, whereby the position of the sensor can be found according to different extents of the physical effects of the different radiating lights.

12 Claims, 5 Drawing Sheets

MULTIDIRECTIONAL OPTICAL POSITIONING METHOD AND DEVICE THEREOF

BACKGROUND OF THE INVENTION

1. Field of the Invention

The present invention relates generally to a multidirectional optical positioning method and a device thereof, and more particularly to a signal transmission and positioning method applied to visible light communication. The multidirectional optical positioning device includes a transparent board and multiple optical coatings coated on the surface of the transparent board. The multidirectional optical positioning method can enhance the precision of signal positioning of the visible light communication and promote the application variability of the visible light communication.

Description of the Related Art

Visible light communication (VLC) is a wireless communication technique employing electromagnetic wave of visible light waveband to transmit data. Such technique has the advantages of high frequency, large bandwidth, no EMI interference, free frequency band, high security and low cost. Moreover, this technique is advantageous in illumination and communication. Currently, the VLC technique is applicable to various fields including indoor wireless Internet access, indoor positioning, local area network, submarine communication and inter-vehicle communication. The VLC technique has become a research and development crucial point in the academic circles and enterprises.

In the VLC technique, visible lights with wavelengths ranging from 400 to 800 THz are currently employed as the communication medium and air serves as the transmission medium. In practice, an electronically controlled light source such as a fluorescent lamp or light-emitting diode (LED) is used to emit high-speed and flickering light signals for transmitting data. Moreover, the transmission end and the receiving end are adjustable according to the requirements of different light wavelengths. In addition, when transmitting data during illumination, especially in use of white light LED, human eyes will totally feel no flickering light because of the white light LED can modulate the light at very high speed. Therefore, both illumination and data transmission effects are achieved at the same time. The VLC technique can be further applied to such as indoor/outdoor illumination, illumination sign, television, computer screen, digital camera, intelligent cellular phone, etc. to provide lighting, illumination and data transmission effects.

According to the above, the VLC technique is able to freely transmit light signals in the air so that the external electromagnetic wave interference can be minimized or even eliminated, especially in a site where radio communication is inhibited, such as a hospital, an aircraft cabin or an oil refining plant. In these sites, the visible light communication can be used without concerning the problems of medical equipment failure or flight safety. Accordingly, the visible light communication overcomes the inconvenience in use of microwave wireless communication.

The conventional visible light communication device includes a light emitting unit with an electronically controlled light source and a sensor. The light emitting unit serves to emit light signals for the sensor to receive. The light signals are then decoded into electronic signals for other electronic devices to receive and read. The light emitting unit generally has the form of a lighting device. Most of the lighting devices have transparent boards made of glass or plastic material. The light signals emitted from the light emitting unit pass through the transparent board and are emitted to outer side.

The above light signal not only can be used to transmit control data, but also can provide lighting position data of the light emitting unit. However, the minimum definition of the lighting position data is simply the distance between the light emitting units. This leads to that the positioning precision of lighting direction and angle of the light emitting unit can be hardly enhanced. Moreover, the light emitting unit applied to the existent visible light communication only provides light with one single physical property such as wavelength, chromatic coordinate, polarity or phase. This can hardly help in solving the above problems.

SUMMARY OF THE INVENTION

It is therefore a primary object of the present invention to provide a multidirectional optical positioning method and a device thereof, and more particularly to provide a multidirectional optical positioning method that can detecting the lighting direction and angle. The multidirectional optical positioning device can overcome the problem of the conventional technique that the minimum definition of the lighting position data is simply the distance between the light emitting units. This leads to that the positioning precision of lighting direction and angle of the light emitting unit can be hardly enhanced. Accordingly, the multidirectional optical positioning method can enhance the signal positioning precision of the visible light communication.

To achieve the above and other objects, the multidirectional optical positioning method of the present invention includes steps of: providing a transparent board, at least one incident light penetrating the transparent board from an incident side to an emission side of the transparent board to produce multiple different radiating lights emitted from the emission side and arranged in one single axial direction of the emission side; and using a sensor positioned on the emission side of the transparent board to receive the radiating lights arranged in the single axial direction so as to find the position of the sensor according to different extents of physical effects of the different radiating lights.

In the above multidirectional optical positioning method, multiple different light conversion layers are laid on the surface of the transparent board to change the physical properties of the penetrating light, the incident light being incident onto the incident side of the transparent board, the incident light passing through the light conversion layers, whereby multiple radiating lights with different physical effects are emitted from the emission side of the transparent board.

In the above multidirectional optical positioning method, the light conversion layers are arranged in one single axial direction of the surface of the transparent board so that the radiating lights with different physical effects are regularly arranged in sequence. The physical effects of the radiating lights are different. This means that the colors and/or color temperatures of the radiating lights are different. The radiating lights are light signals containing data and control data. A light emitting unit is used to project the incident light onto the incident side of the transparent board. The sensor is disposed on the emission side of the transparent board. The physical effects of the radiating lights received by the sensor in different positions are different from each other. For example, in the case that the physical property of the incident light changed by the light conversion layers is wavelength, when the sensor moves to change its position, the sensor is able to receive the radiating light with one single wavelength or simultaneously receive two adjacent radiating lights with two different wavelengths. The radiating light signals with different wavelengths are decoded into electronic signals for an external electronic device to receive and read. At the same time, according to the wavelengths of the received radiating lights, the direction and angle of the radiating lights of the light emitting unit can be found to further find the relative position between the sensor and the light emitting unit. Accordingly, the precision of signal positioning of the visible light communication can be enhanced and the application variability of the visible light communication can be promoted. Certainly, the physical property of the incident light changed by the light conversion layers can be alternatively the chromatic coordinates, polarities or phases.

In the above multidirectional optical positioning method, the light conversion layers on the surface of the transparent board are respectively formed of multiple different light property conversion materials, which are laid over the surface of the transparent board by means of fluorescent, phosphorescent, filtering or polarization coating to form the light conversion layers. The cost for the fluorescent, phosphorescent, filtering and polarization coating is low and the technique of such coating is mature. Therefore, the cost can be saved and the ratio of good products in manufacturing can be increased.

In the above multidirectional optical positioning method, there are multiple sets of transparent boards and incident lights, after the multiple sets of incident lights pass through the light conversion layers and the transparent boards, the sensor receiving multiple sets of radiating lights emitted from the transparent boards to conclusively find the position of the sensor according to the different physical properties of the radiating lights in different positions. Accordingly, by means of comparison between the physical effects of the radiating lights, the position data can be more precisely conclusively calculated.

The multidirectional optical positioning device of the present invention includes: a transparent board having multiple different light conversion layers for changing physical properties of penetrating light, the light conversion layers being arranged in one single axial direction; a light emitting unit disposed on an incident side of the transparent board to project at least one incident light onto the transparent board, after the incident light passing through the light conversion layers, the incident light being converted into multiple radiating lights with different physical effects, the radiating lights being emitted from an emission side of the transparent board and arranged in the single axial direction; and a sensor disposed on the emission side of the transparent board to receive the radiating lights arranged in the single axial direction, whereby the position of the sensor can be found according to different extents of the physical effects of the different radiating lights.

The multidirectional optical positioning device can enhance the precision of signal positioning of the visible light communication and promote the application variability of the visible light communication.

In the above multidirectional optical positioning device, the light conversion layers are disposed on at least one of the surface of the incident side of the transparent board and the surface of the emission side of the transparent board.

In the above multidirectional optical positioning device, the light conversion layers are formed of multiple different light property conversion materials, which are laid over the surface of the transparent board to form the light conversion layers. The light conversion layers are combined into one single optical coating to save cost and increase the ratio of good products in manufacturing.

In the above multidirectional optical positioning device, there are multiple sets of optical coatings, first ends of the multiple sets of optical coatings being interconnected on an axis, second ends of the multiple sets of optical coatings being radially arranged around the axis. Accordingly, the optical coatings are respectively directed in every direction from the axis. When the incident light of the light emitting unit passes through the optical coatings and the transparent board and the radiating lights are emitted from the transparent board, the radiating lights can further provide the directional data to enhance the precision of signal positioning.

In the above multidirectional optical positioning device, there are multiple sets of transparent boards and light emitting units, after the multiple sets of light emitting units project incident lights to pass through the light conversion layers and the transparent boards, the sensor receiving multiple sets of radiating lights emitted from the transparent boards to conclusively find the position of the sensor according to the different physical properties of the radiating lights in different positions. Therefore, the signal positioning precision of the visible light communication can be further enhanced.

In the above multidirectional optical positioning device, the light emitting unit has an electronically controlled light source.

The present invention can be best understood through the following description and accompanying drawings, wherein:

DETAILED DESCRIPTION OF THE PREFERRED EMBODIMENTS

Figure 1:
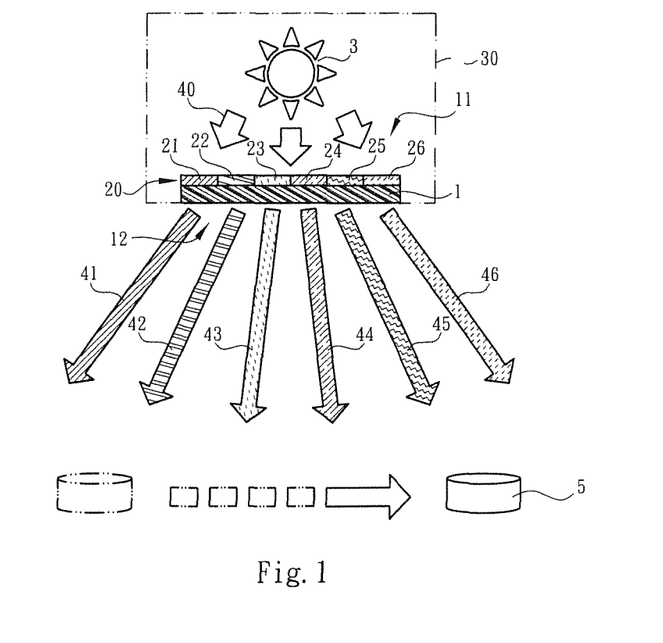
FIG. 1 is a view showing the arrangement of a preferred embodiment of the present invention.
Figure 2:
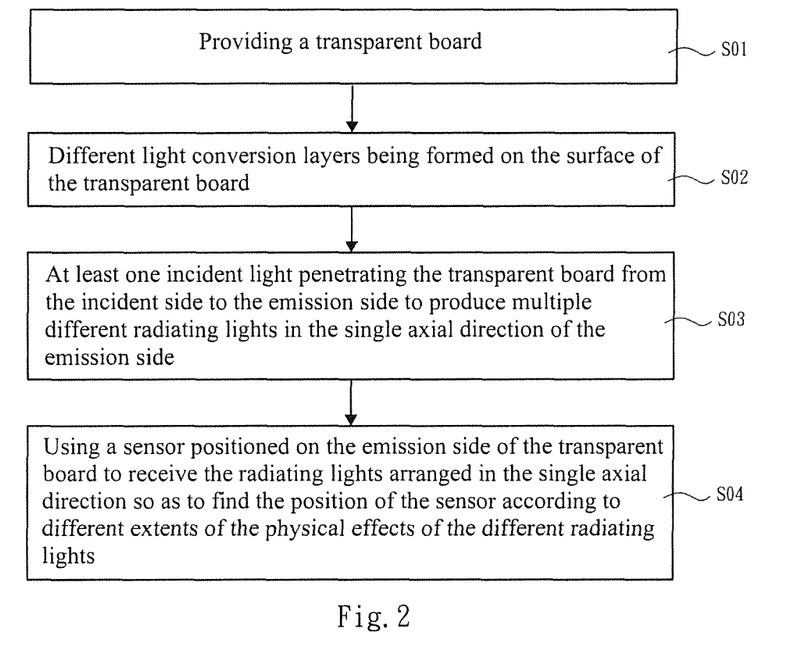
FIG. 2 is a flow chart of the method of the present invention.
Figure 3:
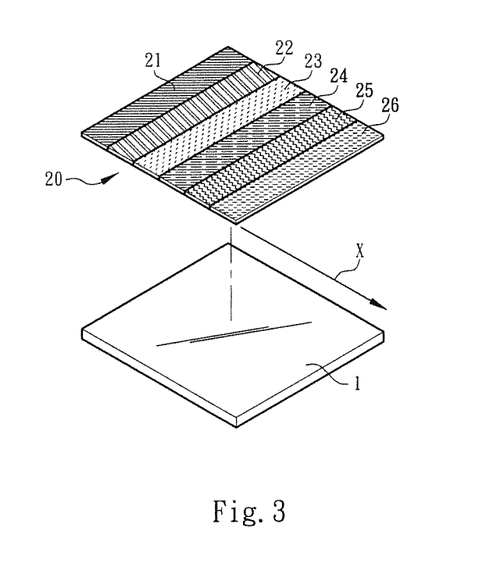
FIG. 3 is a perspective exploded view of the transparent board and the light conversion layers according to FIG. 1.

Please refer to FIGS. 1 and 2. FIG. 1 is a view showing the arrangement of a preferred embodiment of the present invention. FIG. 2 is a flow chart of the method of the present invention. The multidirectional optical positioning method of the present invention includes steps of:

S01. providing a transparent board 1, which can be a transparent board member made of glass or plastic material;

S02. employing multiple different light property conversion materials (such as rare-earth-doped material) and respectively laying the light conversion materials over the top surface and/or bottom surface of the transparent board 1 by means of coating such as fluorescent, phosphorescent, filtering or polarization coating to form light conversion layers of different materials over the surface of the transparent board 1, the light conversion layers serving to change the physical properties of the penetrating light, such as first light conversion layer 21, second light conversion layer 22, third light conversion layer 23, fourth light conversion layer 24, fifth light conversion layer 25 and sixth light conversion layer 26, the first, second, third, fourth, fifth and sixth light conversion layers 21, 22, 23, 24, 25, 26 being sequentially arranged in one single axial direction X (as shown in FIG. 3), that is, the first, second, third, fourth, fifth and sixth light conversion layers 21, 22, 23, 24, 25, 26 being arranged in the horizontal axial direction X of the surface of the transparent board 1 and combined into one single optical coating 20, two faces of the transparent board 1 being respectively defined as an incident side 11 and an emission side 12, the first, second, third, fourth, fifth and sixth light conversion layers 21, 22, 23, 24, 25, 26 being disposed on the surface of the incident side 11 and the surface of the emission side 12 of the transparent board 1;

S03. at least one incident light penetrating the transparent board 1 from the incident side 11 to the emission side 12 to produce multiple different radiating lights in the single axial direction X of the emission side 12, for example, a light emitting unit 3 being positioned on the incident side 11 of the transparent board 1 to project at least one incident light onto the optical coating 20 of the surface of the transparent board 1, the incident light simultaneously passing through the first, second, third, fourth, fifth and sixth light conversion layers 21, 22, 23, 24, 25, 26, whereby multiple radiating lights with different physical effects are emitted from the emission side 12 of the transparent board 1 and arranged in the one single axial direction X, to speak more specifically, the light emitting unit 3 having an electronically controlled light source including a fluorescent lamp or light-emitting diode (LED), the light emitting unit 3 being disposed in the illumination lighting device 30, which is disposed under an indoor or outdoor ceiling, the incident light emitted from the light emitting unit 3 being a light signal containing control data, the transparent board 1 being a transparent board member disposed on the bottom of the lighting device 30 for emitting light to lower side of the ceiling, when the lighting unit 3 emits the incident light with control data, the incident light being defined as an original light signal 40, when the original light signal 40 is projected to the surface of the transparent board 1, the original light signal 40 simultaneously downward passing through the first, second, third, fourth, fifth and sixth light conversion layers 21, 22, 23, 24, 25, 26, by means of the light property conversion materials of the first, second, third, fourth, fifth and sixth light conversion layers 21, 22, 23, 24, 25, 26, the original light signal 40 being converted into multiple radiating lights with different physical effects including wavelength, chromatic coordinates, polarities and phases of the light, in this embodiment, with the wavelength of the light taken as an example of the physical effect, after the original light signal 40 passes through the light conversion layers, the wavelength of the original light signal 40 being changed, whereby the different light conversion layers can produce multiple radiating lights with different wavelengths, the radiating lights with different wavelengths being defined as wavelength shift signals, the wavelengths of the radiating lights being different and this meaning that the colors and/or color temperatures of the radiating lights are different, for example, the first light conversion layer 21 converting the original light signal 40 into first wavelength shift signal 41, the second light conversion layer 212 converting the original light signal 40 into second wavelength shift signal 42, the third light conversion layer 23 converting the original light signal 40 into third wavelength shift signal 43, the fourth light conversion layer 24 converting the original light signal 40 into fourth wavelength shift signal 44, the fifth light conversion layer 25 converting the original light signal 40 into fifth wavelength shift signal 45 and the sixth light conversion layer 26 converting the original light signal 40 into sixth wavelength shift signal 46, the first, second, third, fourth, fifth and sixth wavelength shift signals 41, 42, 43, 44, 45, 46 being similar colors to human eyes, for example, the first, second, third, fourth, fifth and sixth wavelength shift signals 41, 42, 43, 44, 45, 46 being similar visible lights such as yellow, red, blue or green lights, but the wavelengths of the respective radiating lights being different, then, the first, second, third, fourth, fifth and sixth wavelength shift signals 41, 42, 43, 44, 45, 46 being simultaneously projected to lower side of the transparent board 1, the first, second, third, fourth, fifth and sixth light conversion layers 21, 22, 23, 24, 25, 26 being arranged in the single horizontal axial direction X of the surface of the transparent board 1, whereby the first, second, third, fourth, fifth and sixth wavelength shift signals 41, 42, 43, 44, 45, 46 are regularly arranged in sequence to provide illumination effect for the space below the ceiling; and S04. using a sensor 5 positioned on the emission side 12 of the transparent board 1 to receive the radiating lights arranged in the single axial direction X so as to find the position of the sensor 5 according to different extents of the physical effects of the different radiating lights, in practice, the sensor 5 being disposed in the space below the transparent board 1, whereby in both a stationary state and a moving state, the sensor 5 can readily receive the first, second, third, fourth, fifth and/or sixth wavelength shift signals 41, 42, 43, 44, 45, 46, accordingly, the wavelengths of the radiating lights received by the sensor 5 in different positions being different, when the sensor 5 moves to change its position, the sensor 5 being able to receive the radiating light with one single wavelength or simultaneously receive two adjacent radiating lights with two different wavelengths, whereby the position of the sensor 5 can be found according to the wavelengths of the radiating lights.

For example, when the sensor 5 is still and receives the first wavelength shift signal 41, the first wavelength shift signal 41 is transmitted to a photoelectric signal conversion unit (not shown) to decode the first wavelength shift signal 41 into electronic signal. The electronic signal is then output to an external electronic device (not shown) to receive and read the electronic signal. At the same time, the first wavelength shift signal 41 is transmitted to an angle calculation unit (not shown). The position data of the first, second, third, fourth, fifth and sixth light conversion layers 21, 22, 23, 24, 25, 26 are pre-stored in the angle calculation unit. According to the position data and the wavelength of the first wavelength shift signal 41, the angle calculation unit can judge the lighting direction and angle of the lighting unit 3 so as to find the relative position between the sensor 5 and the lighting unit 3. The photoelectric signal conversion unit and the angle calculation unit can be modularized in the sensor 5 or arranged outside the sensor 5. The angle calculation unit can be a computer or a controller.

When the sensor 5 moves to receive both the fifth and sixth wavelength shift signals 45, 46, the fifth and sixth wavelength shift signals 45, 46 are both transmitted to the photoelectric signal conversion unit to decode the fifth and sixth wavelength shift signals 45, 46 into electronic signals for the external electronic device to receive and read. At the same time, the fifth and sixth wavelength shift signals 45, 46 are transmitted to the angle calculation unit. According to the position data and the wavelengths of the fifth and sixth wavelength shift signals 45, 46, the angle calculation unit can judge the lighting direction and angle of the light emitting unit 3 so as to find the relative position between the sensor 5 and the light emitting unit 3. Accordingly, the precision of signal positioning of visible light communication can be enhanced to promote the application variability of the visible light communication. This solves the problem of the conventional technique that the minimum definition of the lighting position data is simply the distance between the light emitting units. This leads to that the positioning precision of lighting direction and angle of the light emitting unit can be hardly enhanced.

It should be noted that the original light signal 40 is converted by the light conversion layers into multiple radiating lights with different physical effects. The physical effects can be alternatively the chromatic coordinates, polarities, phases or other properties of the light. The position of the sensor 5 can be found according to the chromatic coordinates, polarities, phases or other properties of the light.

Figure 4:
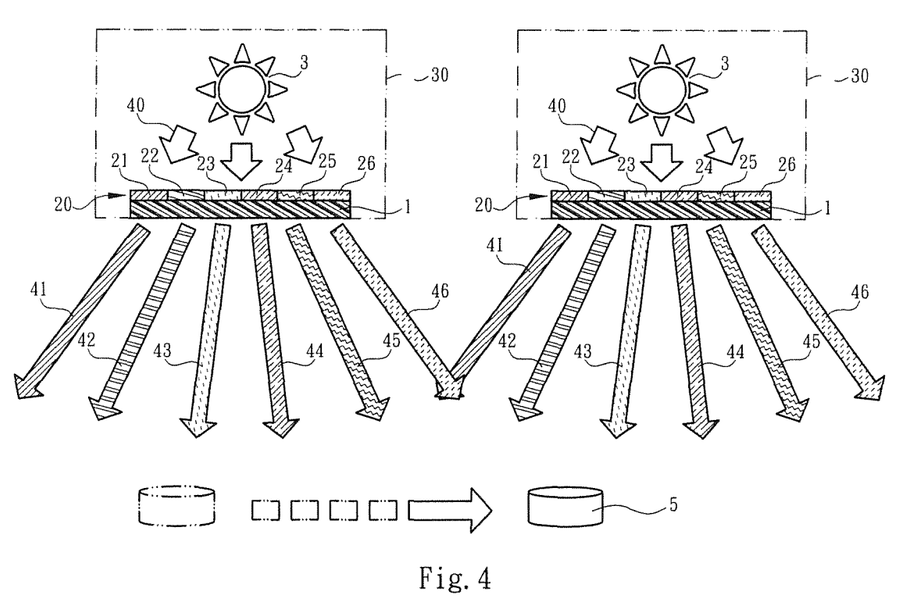
FIG. 4 is a view of another embodiment of the present invention.

Please refer to FIG. 4. In a modified embodiment, there are multiple sets of transparent boards 1 and light emitting units 3. The incident lights of the lighting units pass through the transparent boards 1 to be emitted from the transparent boards 1 and received by the sensor 5. According to the different physical properties of the radiating lights in different positions, the position of the sensor 5 can be conclusively found. Accordingly, by means of comparison between the physical effects of the radiating lights, the position data can be more precisely conclusively calculated.

As shown in FIGS. 1 and 3, the multidirectional optical positioning device of the present invention includes a transparent board 1, a light emitting unit 3 and a sensor 5. The surface of the transparent board 1 has multiple different light conversion layers for changing the physical properties of the penetrating light. The light conversion layers are arranged in one single axial direction X. The light emitting unit 3 is disposed on an incident side 11 of the transparent board 1 to project at least one incident light onto the surface of the transparent board 1. After the incident light passes through the light conversion layers, the incident light is converted into multiple radiating lights with different physical effects, which are emitted from an emission side 12 of the transparent board 1 and arranged in the single axial direction X. The sensor 5 is disposed on the emission side 12 of the transparent board 1 to receive the radiating lights arranged in the single axial direction X. According to different extents of the physical effects of the different radiating lights, the position of the sensor 5 can be found. Accordingly, by means of the multidirectional optical positioning device, the precision of signal positioning of visible light communication can be enhanced to promote the application variability of the visible light communication. The components and application of the multidirectional optical positioning device are identical to those of the above multidirectional optical positioning method.

Figure 5:
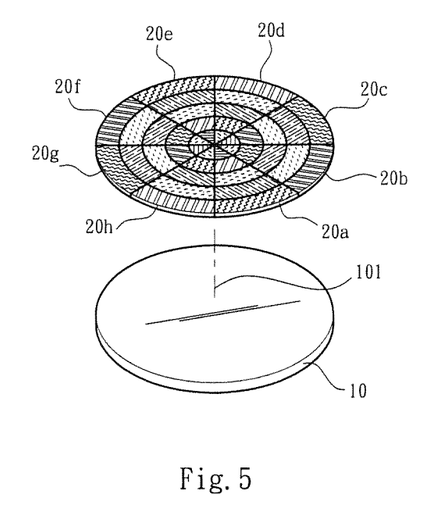
FIG. 5 is a perspective exploded view of still another embodiment of the present invention.

Please now refer to FIG. 5, which shows a modified embodiment of the present invention. In this embodiment, there are multiple sets of optical coatings 20*a*, 20*b*, 20*c*, 20*d*, 20*e*, 20*f*, 20*g*, 20*h*. First ends of the multiple sets of optical coatings 20*a*, 20*b*, 20*c*, 20*d*, 20*e*, 20*f*, 20*g*, 20*h* are interconnected on an axis 101. Second ends of the multiple sets of optical coatings 20*a*, 20*b*, 20*c*, 20*d*, 20*e*, 20*f*, 20*g*, 20*h* are radially arranged around the axis 101. Accordingly, the light conversion layers of the optical coatings 20*a*, 20*b*, 20*c*, 20*d*, 20*e*, 20*f*, 20*g*, 20*h* are arranged in a radial direction. In this case, the optical coatings 20*a*, 20*b*, 20*c*, 20*d*, 20*e*, 20*f*, 20*g*, 20*h* are respectively directed in every direction from the axis 101. When the incident light of the light emitting unit 3 passes through the optical coatings 20*a*, 20*b*, 20*c*, 20*d*, 20*e*, 20*f*, 20*g*, 20*h* and the transparent board 1 and the radiating lights are emitted from the transparent board 1, the radiating lights can further provide the directional data to enhance the precision of signal positioning. The components and application of the multidirectional optical positioning device are identical to those of the above embodiment.

In comparison with the conventional technique, the present invention has the following advantages:

1. The visible lights of the shift signals are independent without interfering with each other. Moreover, the different light conversion layers are coated on the surface of the transparent board 1 to increase the angle and position data of every lighting direction. The light emitting unit 3 utilizes the energization or conversion of different reflection angles of the lighting device 3 in adaptation to the conversion of frequency of the transmitted visible light to implant the data of different directions and positions into the radiating lights. This can enhance the precision of signal positioning of the visible light communication and promote the application variability of the visible light communication.

2. The cost for the fluorescent, phosphorescent, filtering and polarization coating is low and the technique of such coating is mature. Therefore, the coating can be coated on the surface of the transparent board 1 of any lighting device 30 to save cost and enhance the ratio of good products in manufacturing.

3. In the case that multiple sets of transparent boards 1 and light emitting units 3 are employed, the sensor 5 can receive two adjacent shift signals at the same time. Accordingly, multiple sets of shift signals can be compared to provide more precise position data.

4. The multiple sets of optical coatings 20*a*, 20*b*, 20*c*, 20*d*, 20*e*, 20*f*, 20*g*, 20*h* are radially arranged around the single axis 101. In this case, the shift signals not only can provide the directional and angle data, but also can provide position data to enhance the precision of signal positioning.

5. The light-emitting diode is employed as the light source of the light emitting unit 3. In this case, the light modulation speed of the light emitting unit 3 is higher and the lifetime of the light emitting unit 3 is prolonged.

The above embodiments are only used to illustrate the present invention, not intended to limit the scope thereof. Many modifications of the above embodiments can be made without departing from the spirit of the present invention.

What is claimed is:

1. A multidirectional optical positioning method comprising steps of:

providing a transparent board, at least one incident light penetrating the transparent board from an incident side to an emission side of the transparent board to produce multiple different radiating lights emitted from the emission side and arranged in one single axial direction of the emission side, wherein multiple different light conversion layers respectively formed of multiple different light property conversion materials are laid on a surface of the transparent board by means of polarization coating, so as to change physical properties of the incident light, the incident light is incident onto the incident side of the transparent board, and the incident light passes through the light conversion layers, whereby the multiple radiating lights with different physical effects are emitted from the emission side of the transparent board; and using a sensor positioned on the emission side of the transparent board to receive the radiating lights arranged in the single axial direction so as to find the position of the sensor according to different extents of physical effects of the different radiating lights.

2. The multidirectional optical positioning method as claimed in claim 1, wherein there are multiple sets of transparent boards and incident lights, after the multiple sets of incident lights pass through the light conversion layers and the transparent boards, the sensor receives multiple sets of radiating lights emitted from the transparent boards to conclusively find the position of the sensor according to the different physical properties of the radiating lights in different positions.

3. A multidirectional optical positioning device comprising:
 a transparent board having multiple different light conversion layers for changing physical properties of penetrating light, the light conversion layers being arranged in one single axial direction;
 a light emitting unit disposed on an incident side of the transparent board to project at least one incident light onto the transparent board, after the incident light passing through the light conversion layers, the incident light being converted into multiple radiating lights with different physical effects, the radiating lights being emitted from an emission side of the transparent board and arranged in the single axial direction; and
 a sensor disposed on the emission side of the transparent board to receive the radiating lights arranged in the single axial direction, whereby the position of the sensor can be found according to different extents of the physical effects of the different radiating lights;
 wherein there are multiple sets of optical coatings, each of the multiple sets of the optical coatings is combined by the corresponding light conversion layers, first ends of the multiple sets of optical coatings are interconnected on an axis, and second ends of the multiple sets of optical coatings are radially arranged around the axis.

4. The multidirectional optical positioning device as claimed in claim 3, wherein the light conversion layers are disposed on at least one of the surface of the incident side of the transparent board and the surface of the emission side of the transparent board.

5. The multidirectional optical positioning device as claimed in claim 4, wherein the light conversion layers are formed of multiple different light property conversion materials, which are laid over the surface of the transparent board to form the light conversion layers.

6. The multidirectional optical positioning device as claimed in claim 3, wherein there are multiple sets of transparent boards and light emitting units, after the multiple sets of light emitting units project incident lights to pass through the light conversion layers and the transparent boards, the sensor receives multiple sets of radiating lights emitted from the transparent boards to conclusively find the position of the sensor according to the different physical properties of the radiating lights in different positions.

7. The multidirectional optical positioning device as claimed in claim 3, wherein the light emitting unit has an electronically controlled light source.

8. The multidirectional optical positioning device as claimed in claim 5, wherein the light emitting unit has an electronically controlled light source.

9. The multidirectional optical positioning device as claimed in claim 6, wherein the light emitting unit has an electronically controlled light source.

10. A multidirectional optical positioning device comprising:
 a transparent board having multiple different light conversion layers for changing physical properties of penetrating light, the light conversion layers being arranged in one single axial direction, and the light conversion layers being formed of multiple different light property conversion materials, which are laid over the surface of the transparent board to form the light conversion layers;
 a light emitting unit disposed on an incident side of the transparent board to project at least one incident light onto the transparent board, after the incident light passing through the light conversion layers, the incident light being converted into multiple radiating lights with different physical effects, the radiating lights being emitted from an emission side of the transparent board and arranged in the single axial direction; and
 a sensor disposed on the emission side of the transparent board to receive the radiating lights arranged in the single axial direction, whereby the position of the sensor can be found according to different extents of the physical effects of the different radiating lights;
 wherein there are multiple sets of optical coatings, each of the multiple sets of the optical coatings is combined by the corresponding light conversion layers, first ends of the multiple sets of optical coatings are interconnected on an axis, second ends of the multiple sets of optical coatings are radially arranged around the axis.

11. The multidirectional optical positioning device as claimed in claim 10, wherein there are multiple sets of transparent boards and light emitting units, after the multiple sets of light emitting units project incident lights to pass through the light conversion layers and the transparent boards, the sensor receives multiple sets of radiating lights emitted from the transparent boards to conclusively find the position of the sensor according to the different physical properties of the radiating lights in different positions.

12. The multidirectional optical positioning device as claimed in claim 10, wherein the light emitting unit has an electronically controlled light source.

\* \* \* \* \*